United States Patent [19]
Mori et al.

[11] Patent Number: 5,526,549
[45] Date of Patent: Jun. 18, 1996

[54] GROMMET

[75] Inventors: Keisuke Mori; Mikio Fujishita; Masatomo Motokawa; Hiroyuki Ochi, all of Yokkaichi, Japan

[73] Assignee: Sumitomo Wiring Systems, Ltd., Yokkaichi, Mie Pref., Japan

[21] Appl. No.: 266,455

[22] Filed: Jun. 27, 1994

[30] Foreign Application Priority Data

Jul. 1, 1993 [JP] Japan .................................. 5-163626
Apr. 26, 1994 [JP] Japan .................................. 6-088238

[51] Int. Cl.⁶ .................................................. F16L 5/00
[52] U.S. Cl. ............................................. 16/2; 174/153 G
[58] Field of Search ....................... 16/2, 3; 174/152 R, 174/152 A, 153 A, 153 G, 65 G, 152 G

[56] References Cited

U.S. PATENT DOCUMENTS

| | | | |
|---|---|---|---|
| 2,311,427 | 2/1943 | Winkelmeyer | 174/153 G |
| 2,897,533 | 8/1959 | Bull et al. | 16/2 |
| 3,243,240 | 3/1966 | Arthur | 174/153 G |
| 3,245,428 | 4/1966 | Klimak et al. | 74/153 G |
| 3,516,111 | 6/1970 | Heyman | 16/2 |

Primary Examiner—Maurina T. Rachuba
Assistant Examiner—Chuck Y. Mah
Attorney, Agent, or Firm—Greenblum & Bernstein

[57] ABSTRACT

A grommet comprising: a panel mounting portion which is mounted on an opening of a panel and has a large-diameter hole for loosely receiving a wiring harness; a wire receiving portion which is formed axially integrally with the panel mounting portion and has a small-diameter hole for closely receiving the wiring harness; the large-diameter hole being communicated with the small-diameter hole such that the wiring harness is inserted through the small-diameter hole and the large-diameter hole in an insertion direction oriented from the small-diameter hole to the large-diameter hole; and a plurality of ribs which are provided in the large-diameter hole so as to extend in parallel with the insertion direction of the wiring harness.

16 Claims, 10 Drawing Sheets bunch of a plurality of wires 2 is inserted, is formed by
GROMMET

BACKGROUND OF THE INVENTION

The present invention generally relates to a grommet which is mounted on an opening or the like of a panel of a vehicle body in a state where a wiring harness is inserted through the grommet and more particularly, to a grommet which is of a construction for improving, relative to the grommet, adhesive property of filling material filled into a hole of the grommet for inserting the wiring harness therethrough and can be easily molded by a mold.

Conventionally, in case a wiring harness for a motor vehicle is passed through an opening of a panel of a vehicle body or an apparatus so as to be installed, the wiring harness is preliminarily passed through a hole of a grommet made of rubber and then, the grommet is mounted on the opening of the panel such that waterproofing, dustproofing and soundproofing are performed.

However, if a gap exists between the wiring harness and a peripheral surface of the hole of the grommet even when the wiring harness is passed through the hole of the grommet, water penetrates through the gap. Therefore, in case grommets are provided at locations where water penetration is likely to take place, liquid and hardening filling material is filled into the gap between the wiring harness and the peripheral surface of the hole of the grommet so as to upgrade waterproof performance.

Namely, as shown in FIG. 1, a known grommet 1 is obtained by integral molding of rubber by the use of a mold and includes a panel mounting portion 1a formed by a large-diameter cylindrical section and a wire receiving portion 1b formed by a small-diameter cylindrical section. The panel mounting portion 1a is mounted on an opening of a panel P and has a large-diameter hole 1c, while the wire receiving portion 1b has a small-diameter hole 1d communicating with the large-diameter hole 1c. A hole 1e of the grommet 1, through which a wiring harness W constituted by a bundle of a plurality of wires 2 is inserted, is formed by the large-diameter hole 1c and the small-diameter hole 1d. A groove if engageable with the panel P is formed on an outer peripheral surface of the panel mounting portion 1a. Thus, the wiring harness W is inserted through the hole 1e and filling material 3 is filled into a gap between the wiring harness W and the large-diameter hole 1c.

The filling material 3 is usually made of urethane resin, while the grommet 1 is usually made of ethylene-propylene-diene terpolymer (EPDM). However, when the filling material 3 and the grommet 1 are made of the above mentioned materials, respectively, adhesive property of the filling material 3 relative to the grommet 1 is poor and thus, the filling material 3 is readily separated from the grommet 1. Therefore, even if the filling material 3 is filled into the large-diameter hole 1c, such a problem arises that when the wiring harness 2 and/or the grommet 1 is pulled by an external force, the filling material 3 is separated from the grommet 1 and the wires 2 and thus, a gap is formed between the wiring harness W and a peripheral surface of the hole 1e.

In order to solve this problem, Japanese Utility Model Laid-Open Publication No. 1-66713 (1989) proposed two methods of preventing separation of the filling material 3 from the grommet 1 as shown in FIGS. 2 and 3, respectively. In the methods of FIGS. 2 and 3, a circumferential convex portion 1g and a circumferential concave portion 1h are, respectively, formed on an inner peripheral wall of the panel mounting portion 1a, i.e., a peripheral surface of the large-diameter hole 1c. In case the circumferential convex portion 1g or the circumferential concave portion 1h is provided as shown in FIG. 2 or 3, a mold 8 for molding the grommet 1 is constituted by mold portions 8a and 8b split in the direction of the arrow A (FIG. 3) for inserting the wiring harness W through the grommet 1. As a result, since an undercut portion U is produced in the grommet 1, mold release characteristics of the grommet 1 deteriorates extremely and thus, cracks are readily produced at the convex portion 1g or the concave portion 1h at the time of mold release.

Furthermore, when the grommet 1 is expanded by a grommet expander in order to pass the wires 2 of the wiring harness W through the grommet 1, larger cracks spread throughout the grommet from the cracks, so that it becomes impossible to use the grommet in some cases.

Moreover, the circumferential convex portion 1g and the circumferential concave portion 1h extend at right angles to the direction of the arrow A for inserting the wiring harness W through the grommet 1. Hence, when a force is applied to the wiring harness W in the direction of the arrow A, the convex portion 1g and the concave portion 1h act as stoppers for restraining separation of the filling material 3 from the grommet 1. However, when a force is applied to the grommet 1 in the direction of the arrow B perpendicular to the direction of the arrow A, the convex portion 1g and the concave portion 1h do not serve to prevent separation of the filling material 3 from the grommet 1. The force oriented in the direction of the arrow B may be applied to the grommet 1 during assembly of the wiring harness W. Meanwhile, also when the grommet 1 is mounted on a motor vehicle, the grommet 1 is often pulled through its interference with other components. Once the filling material 3 has been separated from an inner peripheral surface of the grommet 1 upon application of the force in the direction of the arrow B to the grommet 1, a gap is formed between the wiring harness W and the inner peripheral surface of the grommet 1 and thus, water penetrates through the gap.

In addition, when the grommet 1 is mounted on the motor vehicle, the wiring harness W is rarely installed straightforwardly in the direction of the arrow A. The wiring harness W is often bent inside the panel P in the direction of the arrow D or outside the panel P in the direction of the arrow E. When the wiring harness W is bent as described above, for example, in the direction of the arrow D, the grommet 1 is thrust leftwards in FIG. 3, so that the filling material 3 is also thrust leftwards in FIG. 3 naturally and thus, a gap S is formed between a right side of the filling material 3 and the inner peripheral surface of the grommet 1. If the gap S is formed in this manner, water penetrates through the gap S as described above.

Meanwhile, when a grommet having a wiring harness inserted therethrough is mounted on a through-hole of a partition wall for separating an engine room and a cabin from each other, filling material is also filled into gaps among wires of the wiring harness so as to prevent penetration of water into the cabin. For example, in a waterproof construction of a grommet disclosed in Japanese Utility Model Laid-Open Publication No. 2-115221 (1990), an increased diameter portion 5 formed by hot-melt adhesive is provided at a junction portion of each of wires 2 of a wiring harness W such that the filling material 3 can be sufficiently filled into gaps among the wires 2. However, in this known waterproof construction of the grommet, many additional operational steps are required to be performed for forming the increased diameter portion 5 at the junction portion of each of the wires 2, thereby resulting in low operational efficiency and high manufacturing cost. Especially, as the number of the wires 2 is increased, the burden of the additional operational steps increases, which is not suitable for mass production.

SUMMARY OF THE INVENTION

Accordingly, an essential object of the present invention is to provide, with a view to eliminating the above mentioned inconveniences inherent in conventional grommets, a grommet in which not only cracks are not produced at the time of mold release by eliminating production of an undercut on the grommet during its molding in a mold, but filling material is not separated from an inner peripheral wall of the grommet even if a force is applied to a wiring harness or the grommet in any direction.

Another important object of the present invention is to provide a grommet which achieves great waterproof effects in a simple construction at low cost and is suitable for mass production.

In order to accomplish these objects of the present invention, a grommet embodying the present invention comprises: a panel mounting portion which is mounted on an opening of a panel and has a large-diameter hole for loosely receiving a wiring harness; a wire receiving portion which is formed axially integrally with the panel mounting portion and has a small-diameter hole for closely receiving the wiring harness; the large-diameter hole being communicated with the small-diameter hole such that the wiring harness is inserted through the small-diameter hole and the large-diameter hole in an insertion direction oriented from the small-diameter hole to the large-diameter hole; and a plurality of ribs which are provided in the large-diameter hole so as to extend in parallel with the insertion direction of the wiring harness.

It is preferable that the panel mounting portion includes a substantially cylindrical portion formed, on its outer peripheral surface, with a groove engageable with a panel and a conical cylinder portion extending continuously from one end of the cylindrical portion to the wire receiving portion. Furthermore, the large-diameter hole has a conical hole connected with the small-diameter hole and the ribs are provided in the conical hole.

It is preferable that the ribs extend radially inwardly from the peripheral surface of the large-diameter hole and are arranged circumferentially at an identical interval so as to be radially disposed between the peripheral surface of the large-diameter hole and an outer peripheral surface of the wiring harness extending at the center of the large-diameter hole. At this time, six or eight ribs are provided circumferentially at an identical interval.

The ribs may be constituted by radially long ribs held in contact with the outer peripheral surface of the wiring harness and radially short ribs disposed between the long ribs such that the number of the ribs is increased.

Furthermore, a boss which is uniform in the insertion direction of the wiring harness may be provided on each of the ribs.

Alternatively, the ribs may be projected so as to be curved from the peripheral surface of the large-diameter hole towards the axis of the large-diameter hole and the ribs may be formed by rods extending axially from a bottom wall of the large-diameter hole.

Namely, as described above, the ribs should be formed uniformly in the insertion direction of the wiring harness such that an undercut portion is not produced on the grommet during molding of the grommet by the use of a mold.

In addition, an inner cylinder may be provided in the large-diameter hole so as to enclose the ribs such that the filling material is filled into the inner cylinder.

The ribs are spaced a predetermined distance axially inwardly from an outer mouth of the large-diameter hole of the panel mounting portion. In a state where the wiring harness has been inserted through the small-diameter hole and the large-diameter hole, the filling material is filled into the large-diameter hole so as to not only be bonded, as a plurality of first filling material sections, to side faces of the ribs, the peripheral surface of the large-diameter hole and an outer peripheral surface of the wiring harness but be spread, as a second filling material section, above the ribs such that the first filling material sections are coupled integrally with each other by the second filling material section.

In case the ribs are provided in the large-diameter hole of the grommet, the ribs are formed uniformly in the insertion direction of the wiring harness. As a result, an undercut portion is not produced on the grommet during molding of the grommet by the use of a mold and cracks are not produced on the ribs at the time of mold release. Therefore, such a phenomenon does not happen that the cracks on the ribs spread to the grommet as a whole.

After the wiring harness has been inserted through the insertion hole of the grommet, which has the large-diameter hole and the small-diameter hole continuously, the liquid filling material is filled into the large-diameter hole and is hardened. Since the filling material is bonded to the many ribs, adhesive area of the filling material is increased greatly, so that adhesive strength of the filling material relative to the grommet is raised and thus, separation of the filling material from the grommet can be prevented positively.

Furthermore, since the first filling material sections filled between the ribs are coupled integrally with each other by the second filling material section filled above the ribs, shift of the first filling material sections can be prevented. As a result, even if an external force is applied to the grommet and the wiring harness bonded to each other by the filling material, deformation of the grommet and the wiring harness can be restrained.

BRIEF DESCRIPTION OF THE DRAWINGS

These objects and features of the present invention will become apparent from the following description taken in conjunction with the preferred embodiments thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
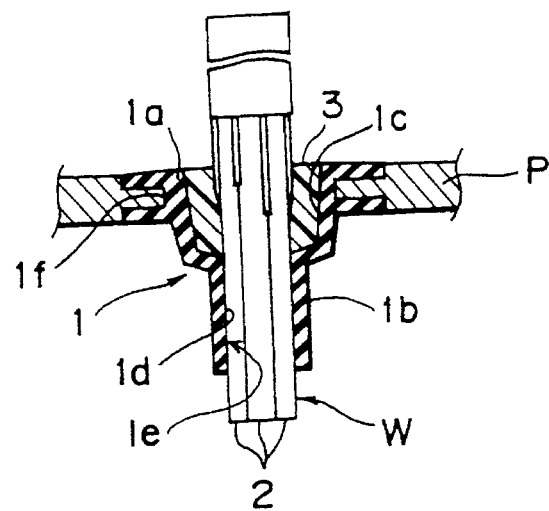
FIG. 1 is a sectional view of a prior art grommet (already referred to)
Figure 2:
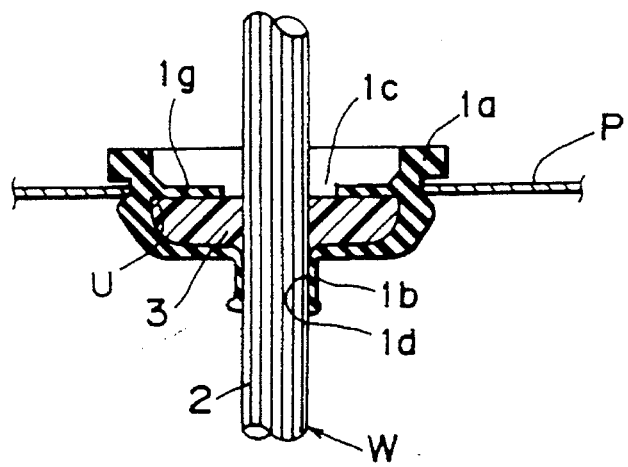
FIGS. 2 and 3 are sectional views showing first and second modifications of the prior art grommet of FIG. 1, respectively (already referred to)
Figure 3:
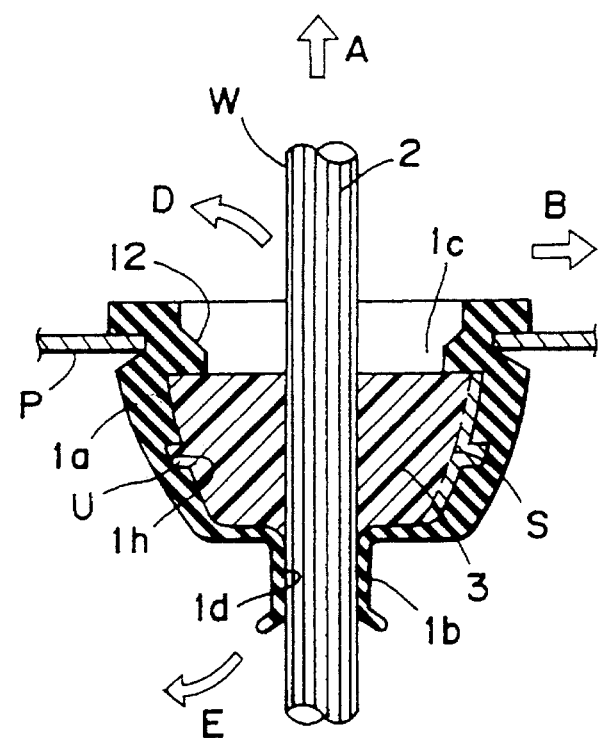
Figure 4:
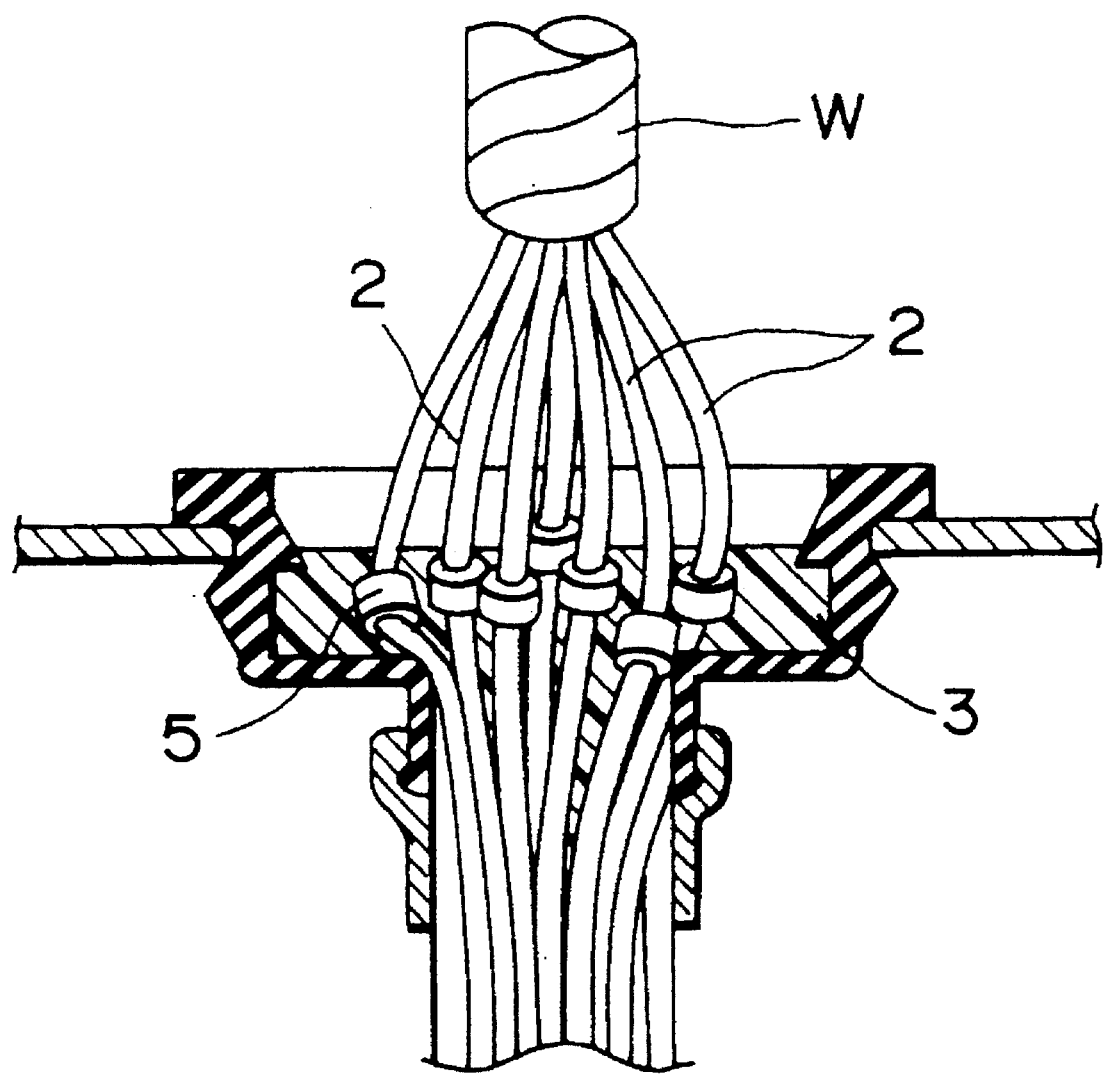
FIG. 4 is a sectional view of another prior art grommet (already referred to)
Figure 5:
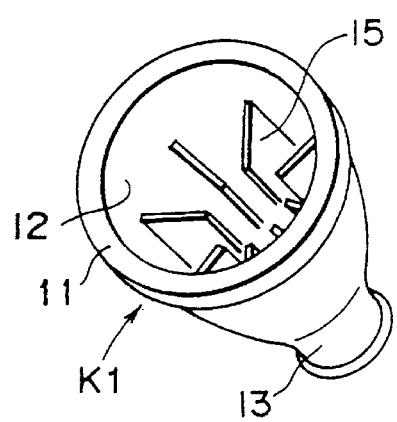
FIG. 5 is a perspective view of a grommet according to a first embodiment of the present invention.
Figure 6:
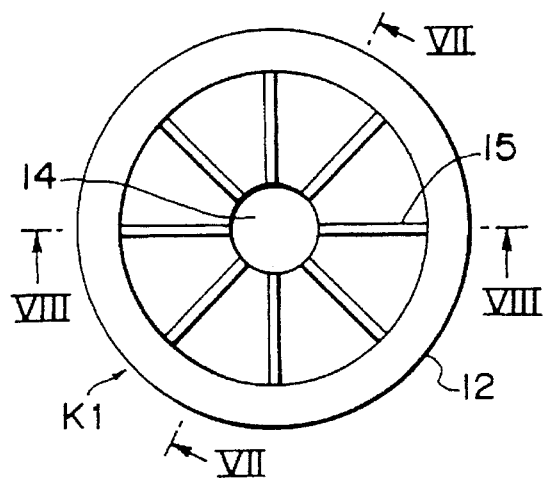
FIG. 6 is a top plan view of the grommet of FIG. 5.
Figure 7:
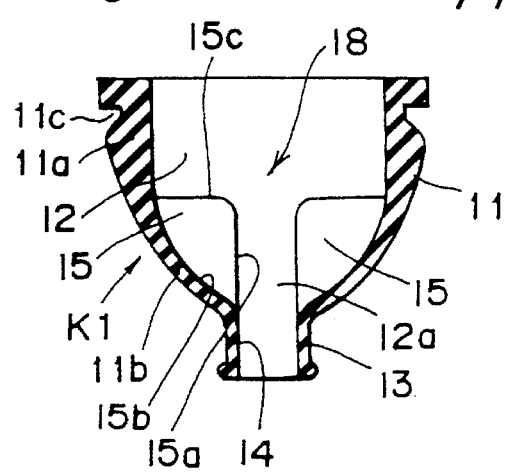
FIG. 7 is a sectional view taken along the line VII—VII in FIG. 6.
Figure 8:
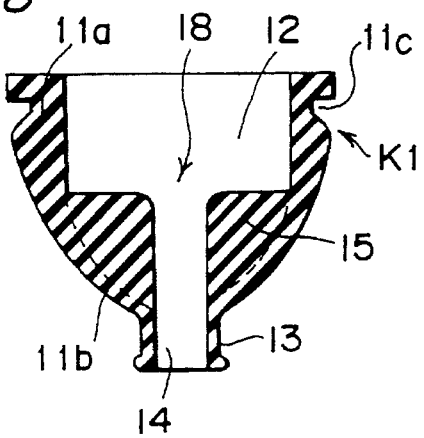
FIG. 8 is a sectional view taken along the line VIII—VIII in FIG. 6.
Figure 9:
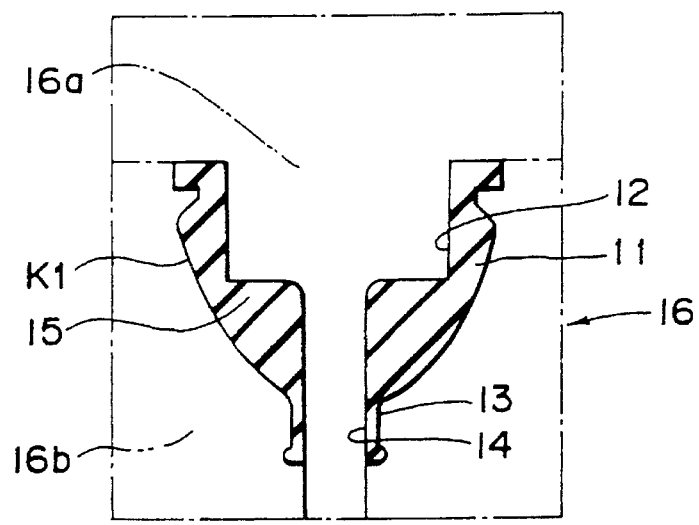
FIG. 9 is a schematic view showing molding of the grommet of FIG. 5 in a mold.

Referring now to the drawings, there is shown in FIGS. 5 to 11, a grommet K1 according to a first embodiment of the present invention. In the grommet K1, a panel mounting portion 11 and a wire receiving portion 13 are formed continuously. The grommet K1 is obtained by integral molding by filling molten rubber into a mold 16 which is constituted by mold portions 16a and 16b as shown in FIG. 9.

The panel mounting portion 11 includes a large-diameter cylinder portion 11a having an open end and a conical cylinder portion 11b extending continuously from the large-diameter cylinder portion 11a. A groove 11c engageable with a panel (not shown) of a vehicle body is formed on an outer peripheral surface of the large-diameter cylinder portion 11a.

A large-diameter hole 12 formed by a hollow of the panel mounting portion 11 has a conical hole 12a in the vicinity of the conical cylinder portion 11b and is communicated, through the conical hole 12a, with a small-diameter hole 14 formed by a hollow of the wire receiving portion 13. A hole 18 of the grommet K1, through which a wiring harness W (FIG. 11) is inserted, is formed by the small-diameter hole 14 and the large-diameter hole 12. The wiring harness W is closely fitted into the small-diameter hole 14.

A plurality of ribs 15 each formed by a triangular flat plate extend radially inwardly from a peripheral surface of the conical hole 12a of the large-diameter hole 12 so as to be arranged at an equal interval circumferentially. In this embodiment, eight ribs 15 are provided at a circumferential interval of 45° such that a radially inner edge of each of the ribs 15 is brought into light contact with an outer peripheral surface of the wiring harness W. Thus, when the wiring harness W has been inserted through the hole 18, the ribs 15 are radially disposed between the outer peripheral surface of the wiring harness W and the peripheral surface of the large-diameter hole 12.

More specifically, each rib 15 extends in parallel with the direction of the arrow A (FIG. 11) for inserting the wiring harness W through the hole 18, i.e. vertically in FIG. 8 and is constituted by an axial linear portion 15a which is brought into contact with an outer peripheral surface of the wiring harness W, an oblique portion 15b which extends from a lower point of the linear portion 15a continuously along the peripheral surface of the conical hole 12a and a radial linear portion 15c which connects the oblique portion 15b and an upper end of the axial linear portion 15a. The radial linear portion 15c does not axially extend towards a mouth of the large-diameter hole 12 beyond the conical hole 12a.

The ribs 15 each formed by a plate extending in the direction of the arrow A are uniform in the direction of the arrow A. Therefore, when the grommet K1 is molded by using the mold portions 16a and 16b as shown in FIG. 9, an undercut portion is not produced on the grommet K1. Thus, at the time of release of the mold portion 16a for forming a hollow, cracks are not produced at any location of the grommet K1 including the ribs 15.

As is apparent in FIGS. 5, 6, 10, 12, 13, 14, 22C, 22D, 25A, 25B and 25C, when the grommet is cut along a plane orthogonal to the insertion direction of the wiring harness, each of the ribs has a uniform thickness in such plane.

Figure 10:
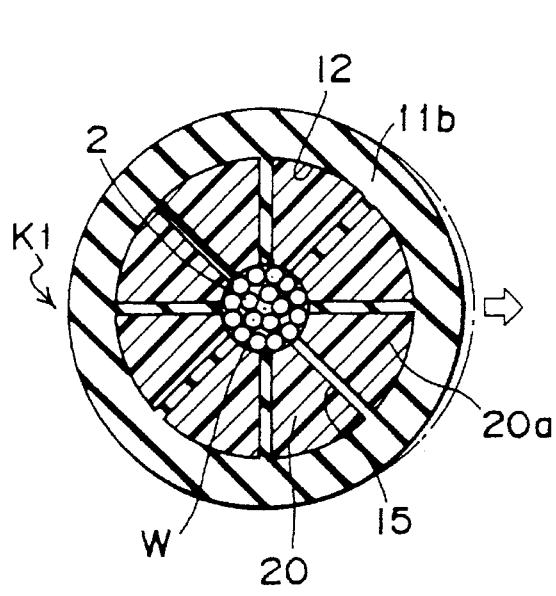
FIG. 10 is a horizontal sectional view of the grommet of FIG. 5, through which a wiring harness has been inserted and into which filling material has been filled.
Figure 11:
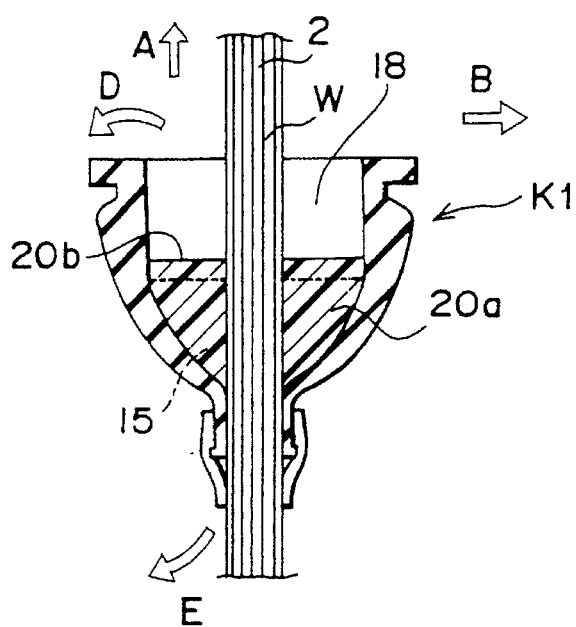
FIG. 11 is a vertical sectional view of the grommet of FIG. 10.

In the grommet K1 of the above described arrangement, the wiring harness W is passed from the small-diameter hole 14 to the center of the large-diameter hole 12 so as to be inserted through the hole 18 as shown in FIGS. 10 and 11. Then, liquid filling material 20 is filled into the large-diameter hole 12 and is hardened. Thus, the filling material 20 is filled among the ribs 15 and above the radial linear portion 15c of each of the ribs 15 such that the ribs 15 are embedded in the filling material 20. The thus hardened filling material 20 includes a plurality of trapezoidal sections 20a having a substantially trapezoidal horizontal section and disposed between neighboring ones of the ribs 15 and an annular section 20b having an annular horizontal section and disposed on the ribs 15. The trapezoidal sections 20a are integrally coupled with each other by the annular section 20b at upper portions of the trapezoidal sections 20a.

Opposite circumferential faces of the trapezoidal sections 20a are, respectively, bonded to side faces of the neighboring ones of the ribs 15, while an outer peripheral surface of each of the trapezoidal sections 20a is bonded to the peripheral surface of the large-diameter hole 12. Furthermore, an inner peripheral surface of each of the trapezoidal sections 20a is bonded to an outer peripheral surface of the wiring harness W. Since adhesive area of the trapezoidal sections 20a to the grommet K1 is increased as described above, adhesive strength of the filling material 20 relative to the grommet K1 is increased and thus, the filling material 20 is not readily separated from the grommet K1.

Meanwhile, the annular section 20b is bonded to the upper portions of all the trapezoidal sections 20a and acts as a lid for the trapezoidal sections 20a so as to prevent the trapezoidal sections 20a from being shifted in the direction of the arrow A and the direction of the arrow B perpendicular to the direction of the arrow A.

In case the grommet K1, in which after the wiring harness W has been inserted through the hole 18, the filling material 20 is filled into the large-diameter hole 12, is mounted on an opening of a panel of a vehicle body, the wiring harness W and the grommet K1 are retained by adhesive force of the filling material 20 even if a pulling force is applied to the wiring harness W and the grommet K1. As a result, a gap is not produced between the filling material 20 and the inner peripheral surface of the grommet K1. For example, even if a pulling force is applied to the wiring harness W in the direction of the arrow A for inserting the wiring harness W through the hole 18, the trapezoidal sections 20a are powerfully bonded to the neighboring ribs 15 over a large adhesive area. Furthermore, since the trapezoidal sections 20a are integrally coupled with each other by the annular section 20b, such a case does not occur in which the filling material 20 is pulled together with the wiring harness W so as to be separated from the ribs 15 and the peripheral surface of the large-diameter hole 12.

Meanwhile, in case the grommet K1 is pulled in the direction of the arrow B perpendicular to the direction of the arrow A, the grommet K1 is inclined to be deformed as shown by the one-dot chain line in FIG. 10. However, actually, since the trapezoidal sections 20a are coupled with each other by the annular section 20b, the trapezoidal sections 20a are not shifted at all. Furthermore, since the trapezoidal sections 20a are bonded to the ribs 15 over a large area so as to retain the ribs 15, deformation of the grommet K1 does not take place and thus, separation of the filling material 20 from the inner peripheral surface of the grommet is prevented.

Furthermore, even if the wiring harness W is bent in the directions of the arrows D and E, the trapezoidal sections 20a are not shifted at all in the same manner as described above. In addition, since this secure filling material 20 and the grommet K1 are bonded to each other over a large area through the ribs 15, deformation of the grommet K1 is prevented and thus, the filling material 20 is not separated from the grommet K1.

As described above, even if a force is applied to the wiring harness W and the grommet K1 in any direction, the filling material 20 is securely bonded to the inner peripheral surface of the grommet K1 so as not to be separated from the inner peripheral surface of the grommet K1. Therefore, there is no possibility that water penetration through a gap produced by separation of the filling material 20 from the inner peripheral surface of the grommet K1 takes place, thereby resulting in improvement of waterproof performance.

Figure 12:
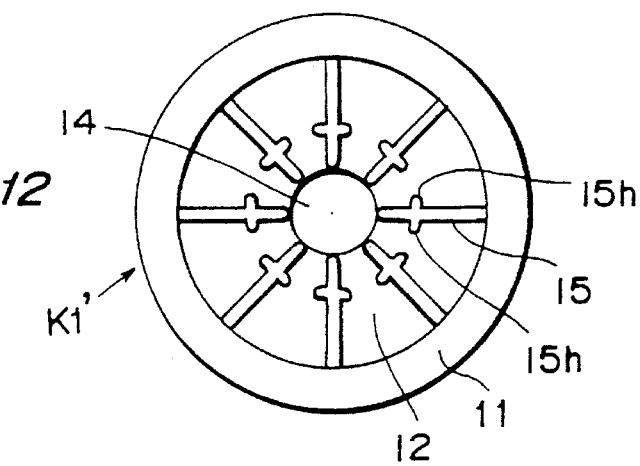
FIG. 12 is a view similar to FIG. 6, particularly showing its modification.

FIG. 12 shows a grommet K1' which is a modification of the grommet K1. In the grommet K1', a pair of bosses 15h are, respectively, provided on opposite side faces of the rib 15 at a location radially intermediate between the axis of the large-diameter hole 12 and the peripheral surface of the large-diameter hole 12 and extend axially continuously so as to have a uniform shape in the direction of the arrow A. The boss 15h is arranged to prevent production of an undercut portion on the grommet K1' at the time of its molding by the use of a mold. By providing the bosses 15h on the rib 15, adhesive area of the trapezoidal sections 20a relative to the ribs 15 is increased and thus, adhesive force of the filling material 20 can be increased.

Figure 13:
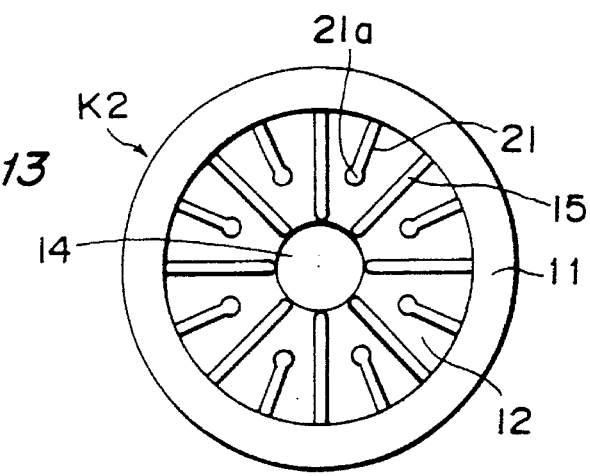
FIG. 13 is a top plan view of a grommet according to a second embodiment of the present invention.

FIG. 13 shows a grommet K2 according to a second embodiment of the present invention. In the grommet K2, a short rib 21 is provided at a central portion between the neighboring ribs 15 spaced 45° from each other so as to extend radially inwardly from the peripheral surface of the large-diameter hole 12 and has an enlarged spherical distal end 21a. In order to prevent production of an undercut portion on the grommet K2 at the time of its molding by the use of a mold, the grommet K2 is also formed uniformly in the direction of the arrow A. By providing the short rib 21 between the long ribs 15, adhesive area of the filling material 20 relative to the grommet K2 is further increased and thus, adhesive force of the filling material 20 is raised further.

Figure 14:
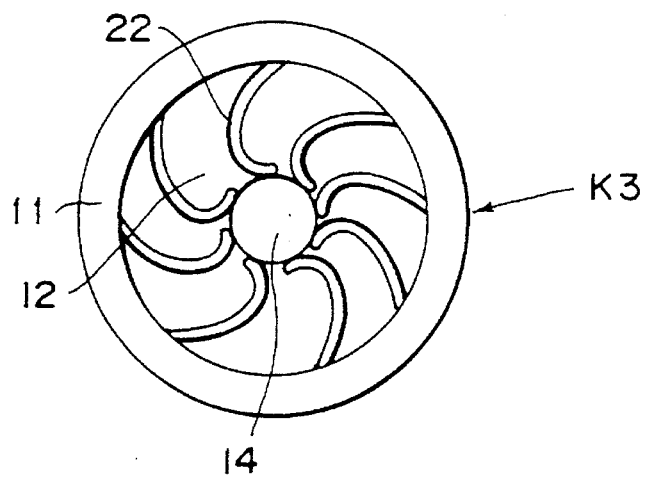
FIG. 14 is a top plan view of a grommet according to a third embodiment of the present invention.

FIG. 14 shows a grommet K3 according to a third embodiment of the present invention. In the grommet K3, a plurality of curved ribs 22 project radially inwardly from the peripheral surface of the large-diameter hole 12. By employing the curved ribs 22 each having a large surface area, adhesive area of the filling material 20 relative to the curved ribs 22 is increased.

Figure 15:
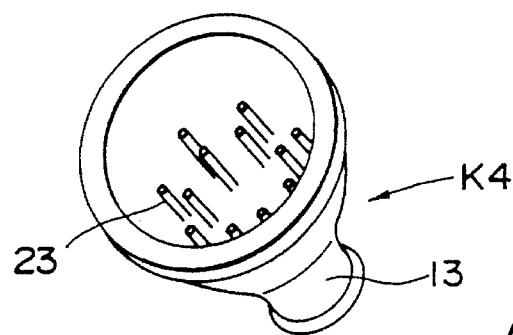
FIG. 15 is a perspective view of a grommet according to a fourth embodiment of the present invention.
Figure 16:
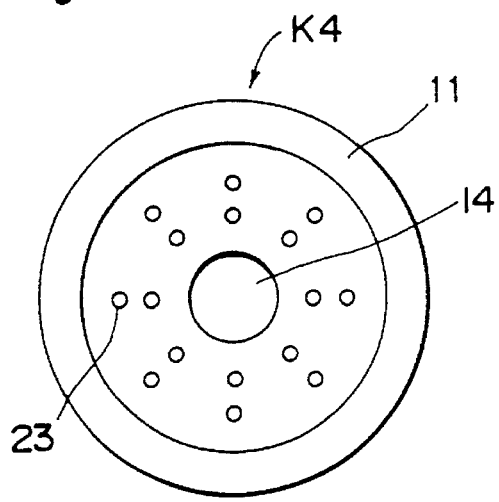
FIG. 16 is a top plan view of the grommet of FIG. 15.
Figure 17:
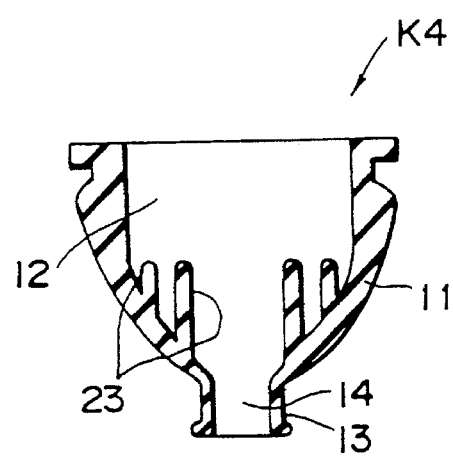
FIG. 17 is a vertical sectional view of the grommet of FIG. 15.

FIGS. 15 to 17 show a grommet K4 according to a fourth embodiment of the present invention. In the first to third embodiments referred to above, the platelike ribs project radially inwardly from the peripheral surface of the large-diameter hole 12. However, in place of the platelike ribs, a plurality of ribs 23 each formed by a circular rod project in the direction of the arrow A from the inner peripheral surface of a constricted diameter side of the conical cylinder portion 11b, namely, from a bottom wall of the large-diameter hole 12 in FIG. 17 in this embodiment.

The rodlike ribs 23 are spaced from each other not only radially but circumferentially. Needless to say, the ribs 23 are also formed uniformly in the direction of the arrow A for inserting the wiring harness W through the hole 18 such that an undercut portion is not formed on the grommet K4 at the time of its molding by the use of a mold. By employing the rodlike ribs 23, adhesive strength of the filling material 20 relative to the grommet K4 can also be increased.

Figure 18:
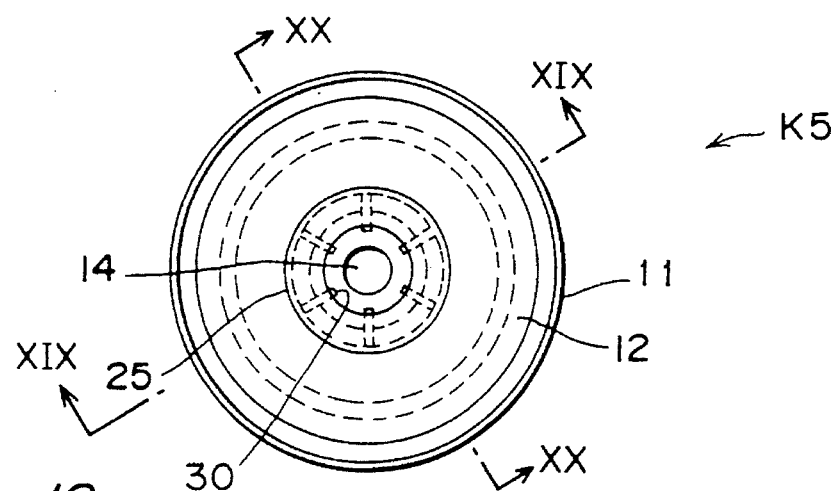
FIG. 18 is a top plan view of a grommet according to a fifth embodiment of the present invention.
Figures 19, 20:
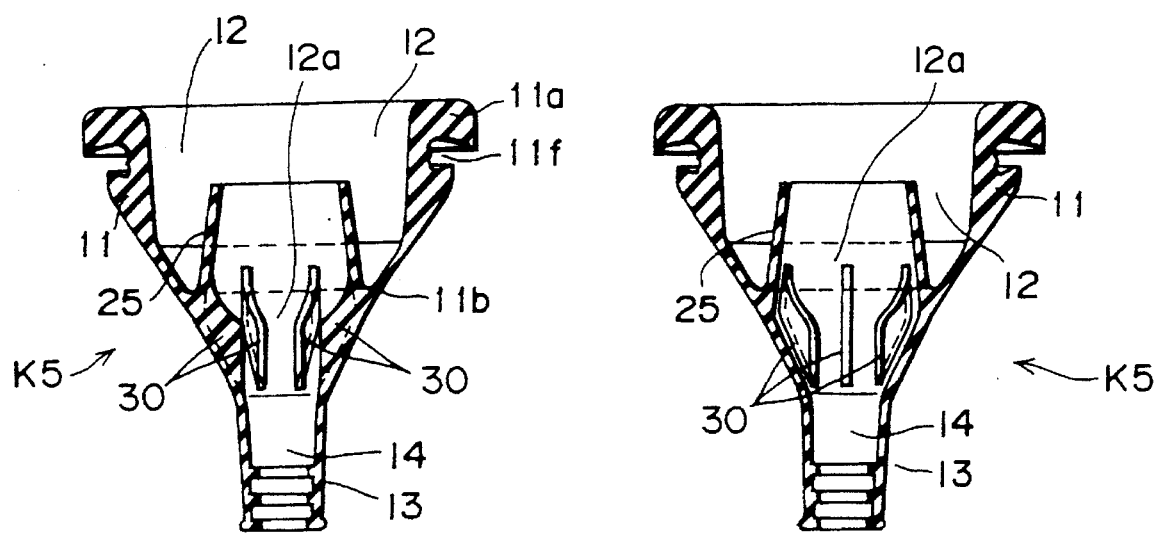
FIG. 19 is a sectional view taken along the line XIX—XIX in FIG. 18.
FIG. 20 is a sectional view taken along the line XX—XX in FIG. 18.

FIGS. 18 to 20 show a grommet K5 according to a fifth embodiment of the present invention. In the grommet K5, a plurality of ribs 30 extend radially from the peripheral surface of the conical hole 12a of the large-diameter hole 12, while an inner cylinder 25 projects from the peripheral surface of the conical hole 12a in the direction of the arrow A so as to enclose the ribs 30 from outside. The ribs 30 are also so formed uniformly in the direction of the arrow A such that an undercut portion is not produced on the grommet K5 at the time of its molding by the use of a mold. When the filling material 20 is filled into the inner cylinder 25, the filling material is filled among the ribs 30 and on the ribs 30 in the inner cylinder 25 so as to be bonded to the ribs 30, an inner peripheral surface of the inner cylinder 25 and the outer peripheral surface of the wiring harness W.

Even if an external force is applied to the large-diameter cylinder portion 11a of the panel mounting portion 11 of the grommet K5, this external force is not directly exerted on the filling material 20 by the inner cylinder 25, so that separation of the filling material 20 from the inner cylinder can be prevented. Furthermore, by reducing quantity of the filling material 20 required for filling the grommet K5, production cost of the grommet K5 can be reduced.

As is clear from the foregoing description of the grommets K1 to K5 of the present invention, the ribs, which are provided in the large-diameter hole so as to increase adhesive strength of the filling material for waterproofing, etc. relative to the grommet, project in parallel with the direction for inserting the wiring harness through the hole of the grommet and are formed uniformly in the direction for inserting the wiring harness through the hole of the grommet. Therefore, production of an undercut portion on the grommet at the time of its molding by the use of a mold can be prevented by providing the ribs. Accordingly, when the molded grommet is released from the mold, cracks are not produced on the grommet and thus, the grommet can be molded easily and accurately.

Meanwhile, since the ribs provided in the large-diameter hole are formed by flat plates arranged radially between the outer peripheral surface of the wiring harness and the peripheral surface of the large-diameter hole, adhesive area between the filling material filled among the ribs and the ribs can be raised greatly, so that adhesive strength between the filling material and the grommet can be raised remarkably.

Furthermore, the filling material filled among the ribs is integrally coupled with the filling material filled above the ribs so as not to be shifted. Therefore, even if an external force is applied to the wiring harness and the grommet in any direction, deformation of the wiring harness and the grommet is restrained by adhesive force of the filling material relative to the wiring harness and the grommet.

Since adhesive force of the filling material relative to the grommet is raised and deformation of the wiring harness and the grommet is restrained, separation of the filling material from the grommet can be prevented positively and thus, water penetration through a gap due to separation of the filling material from the grommet can be prevented.

Figure 21:
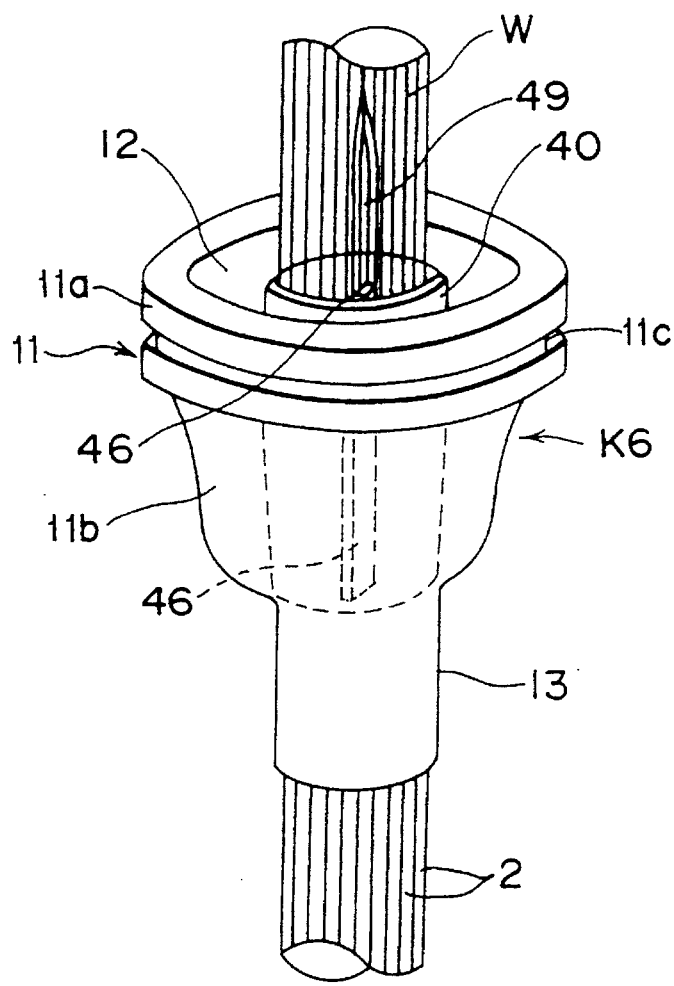
FIG. 21 is a perspective view of a grommet according to a sixth embodiment of the present invention, through which a wiring harness is inserted.
Figure 22A:
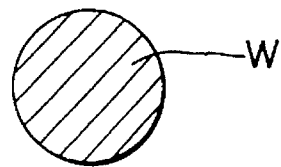
FIGS. 22A to 22E are horizontal sectional views at respective vertical locations of the grommet of FIG. 21.
Figure 22B:
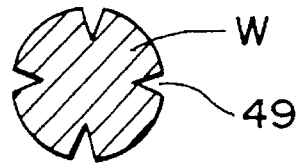
Figure 22C:
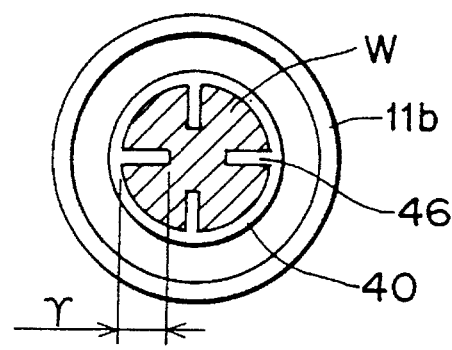
Figure 22D:
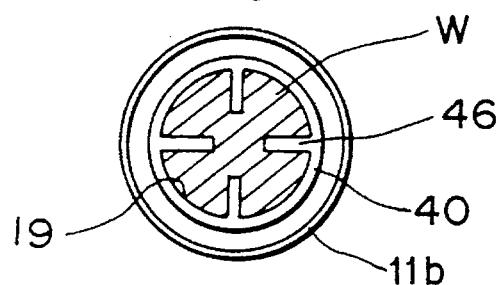
Figure 22E:
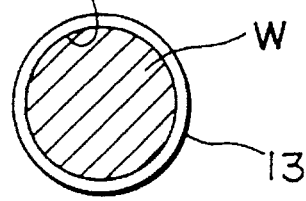
Figure 23:
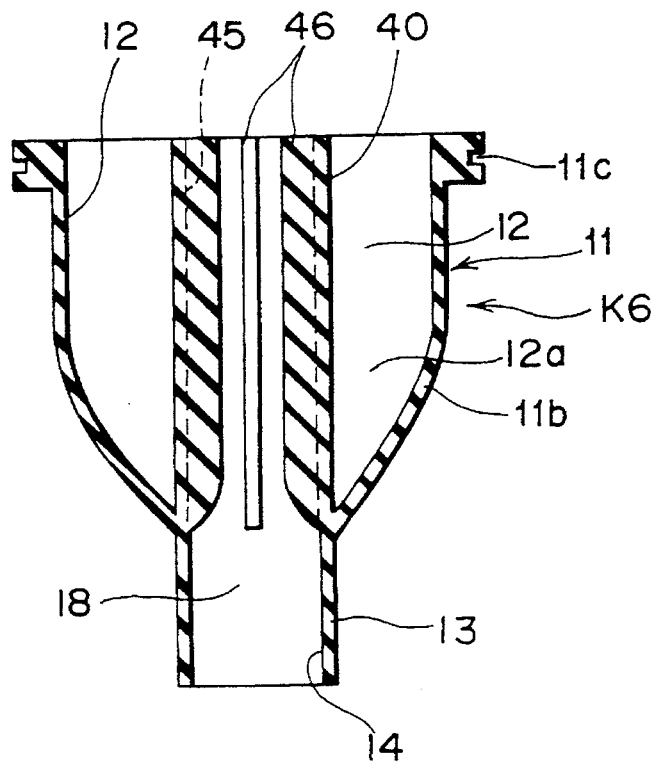
FIG. 23 is a vertical sectional view of the grommet of FIG. 21.

Meanwhile, FIG. 21 shows a grommet K6 through which the wiring harness W is inserted, according to a sixth embodiment of the present invention. The grommet K6 is structurally similar to the grommet K5 and includes a tubular portion 40. The tubular portion 40 extends upwardly from the bottom of the peripheral surface of the conical hole 12a and has a hole 45 of a diameter substantially identical with that of the small-diameter hole 14 of the wire receiving portion 13 such that the hole 45 is directly communicated with the small-diameter hole 14. Four wire separating portions 46 are provided in the tubular portion 40 at an identical circumferential interval so as to extend radially inwardly from an inner peripheral surface of the tubular portion 40. The wire separating portions 46 are each formed by a substantially flat plate and have an axial dimension substantially identical with that of the tubular portion as shown in FIG. 23. A thickness t (FIG. 24) of each of the wire separating portions 46 is so set as to be slightly larger than a diameter of a tip of a nozzle 48 for injecting the filling material 20, while a radial dimension r (FIG. 22C) of each of the wire separating portions 46 is set at 10 to 35% of the diameter of the hole 45.

Figure 24:
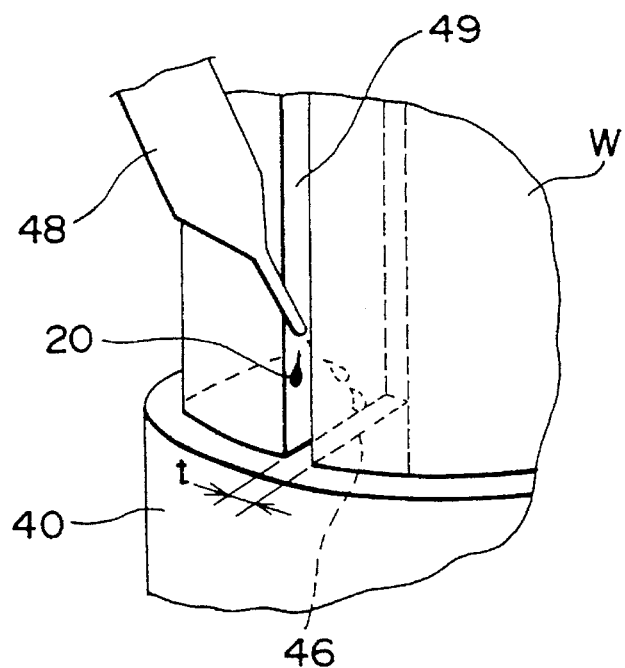
FIG. 24 is a fragmentary perspective view showing filling of filling material into the grommet of FIG. 21.

The wire separating portions 46 extend from the peripheral surface of the hole 45 of the tubular portion 40 disposed in the large-diameter hole 12 of the panel mounting portion 11 as described above. Therefore, the grommet K6 has a desired rigidity against the wiring harness W in contrast with a case in which ribs extend from the peripheral surface of the large-diameter hole 12. Accordingly, in a state where the wiring harness W has been inserted through the hole 18, the wiring separating portions 46 are positively thrusted in between wires 2 of the wiring harness W, so that desired clearances 49 can be formed between the wires 2 of the wiring harness W and thus, the tip of the nozzle 48 can be inserted into the wiring harness W from the clearances 49 as shown in FIG. 24. Especially, when the radial dimension r of each of the wire separating portions 46 is set at 15 to 30%, most preferably about 15% of the diameter of the hole 45 of the tubular portion 40, it is possible to positively prevent elastic deformation of the grommet K6 during insertion of the wiring harness W through the hole 18 of the grommet K6. This is because as the radial dimension r of each of the wire separating portions 46 is reduced, rigidity of the wire separating portions 46 is increased further and thus, the wire separating portions 46 can be inserted in between the wires 2 of the wiring harness W more easily. Meanwhile, if the grommet K6 is made of material having a high hardness of, for example, 60 to 70 Hs in place of ordinary material having a hardness of 50 Hs, it becomes possible to prevent elastic deformation of the grommet K6 during insertion of the wiring harness W through the hole 18 of the grommet K6 more positively.

In the grommet K6 of the above described arrangement, the hole 45 of the tubular portion 40 and the small-diameter hole 14 of the wire receiving portion 13, i.e., the hole 18 is initially expanded by using a jig (not shown) and then, the wiring harness W is inserted through the hole 18. In this state, the wire separating portions 46 formed on the tubular portion 40 are spaced from the outer periphery of the wiring harness W. Subsequently, by removing the jig, the tubular portion 40 and the wire receiving portion 13 are returned to their original forms. As a result, the wire separating portions 46 are thrusted in between the wires 2 of the wiring harness W, so that the clearances 49 are formed between the wires 2 and thus, the wiring harness W is divided into four sections substantially. Meanwhile, the peripheral surface of the small-diameter hole 14 and the hole 45 are brought into close contact with the outer peripheral surface of the wiring harness W.

Figure 25A:
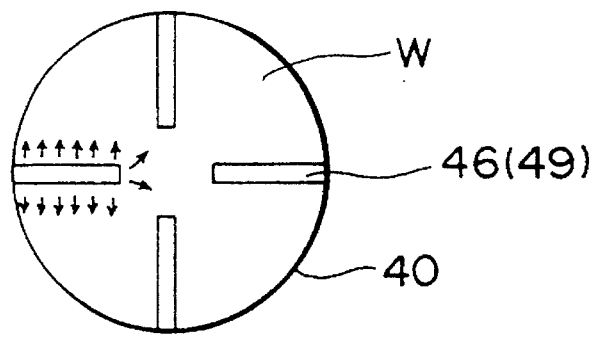
FIGS. 25A to 25C are schematic sectional views showing states of infiltration of filling material in a tubular portion of the grommet of FIG. 21.
Figure 25B:
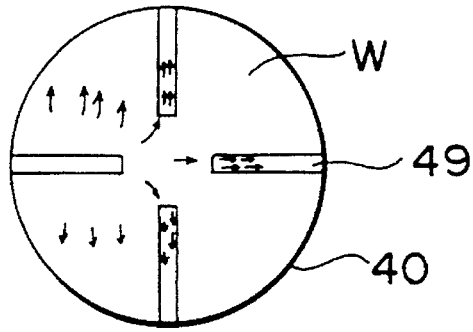
Figure 25C:
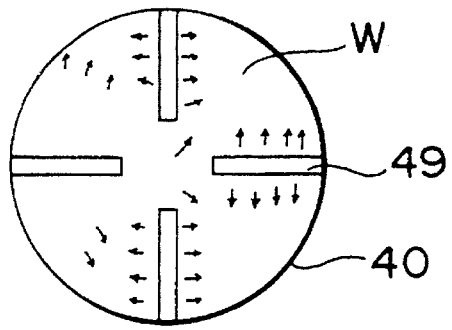

At this time, the tip of the nozzle 48 is inserted into each of the clearances 49 so as to inject the filling material 20 among the wires 2 of the wiring harness W. The filling material 20 may be made of polyether having a viscosity of 350 to 400 cps, a hardness of 20 and a hardening period of 3 min., dimer aliphatic acid alcohol having a viscosity of 2700 cps, a hardness of 50 to 60 and a hardening period of 5 min., etc. As shown in FIG. 25A, the injected filling material 20 is infiltrated into the wiring harness W from between the wires 2 confronting one clearance 49 so as to be filled among the wires 2. At this time, the filling material 20 infiltrated into the wiring harness W leaks to the wires 2 confronting the remaining clearances 49 as shown in FIG. 25B. After the filling material 20 has spread over surfaces of the wires 2 confronting the remaining clearances 49, the filling material 20 is infiltrated into the wires 2 confronting the remaining clearances 49 as shown in FIG. 25C.

Therefore, the filling material 20 is not only infiltrated into the wiring harness W from between the wires 2 confronting the one clearance 49 provided with the nozzle 48 but infiltrated into the wiring harness W after spreading over the surfaces of the wires 2 confronting the remaining clearances 49. Consequently, the filling material 20 is infiltrated into wire bundles obtained by dividing the wires 2 by the wire separating portions 46 and thus, filling operation of the filling material 20 can be performed quite efficiently. Especially, material which is likely to be hardened, for example, a two-part system is most optimum for the filling material 20.

In the grommet K6, the number of the wire separating portions 46 is four, but may assume any value, e.g. one.

However, if the wiring harness W is divided into a plurality of the wire bundles as described above, infiltration of the filling material 20 into the wiring harness W is enhanced. To this end, it is preferable that each wire bundle has 150 wires 2.

Meanwhile, in the grommet K6, the wire separating portions 46 have an axial dimension substantially identical with that of the tubular portion 40 but may also be provided only in the vicinity of a mouth of the hole 45 of the tubular portion 40.

Figure 26:
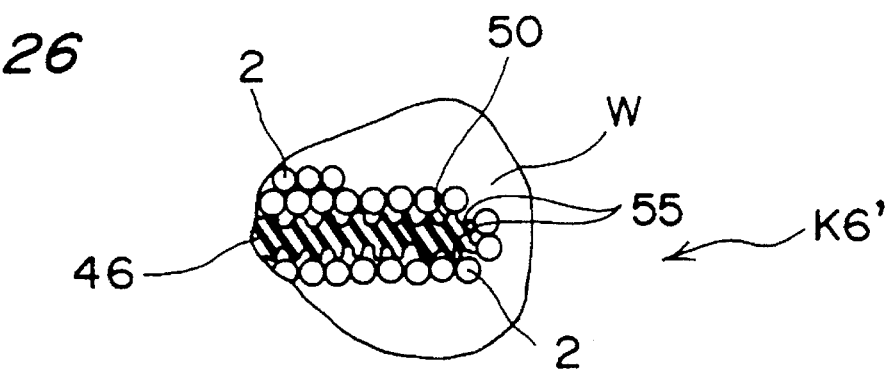
FIG. 26 is a sectional view showing a tubular portion of a grommet which is a first modification of the grommet of FIG. 21.

Furthermore, in the grommet K6, the wire separating portions 46 are each formed by a substantially flat plate. However, if a corner of a lower end, i.e., a corner of a front end of each of the wire separating portions 46 is rounded as shown in FIG. 23, insertion of the wire separating portions 46 into the wires 2 is facilitated. Meanwhile, as shown in FIG. 26 depicting a grommet K6' which is a modification of the grommet K6, if convex and concave portions 55 are formed alternately on an outer peripheral surface of each of the wire separating portions 46, which is brought into contact with the wires 2 so as to form gaps 50 between the wire separating portion 46 and the corresponding wires 2, the filling material 20 is readily infiltrated from the gaps 50 into the wiring harness W in the axial direction of the grommet K6'.

Figure 27:
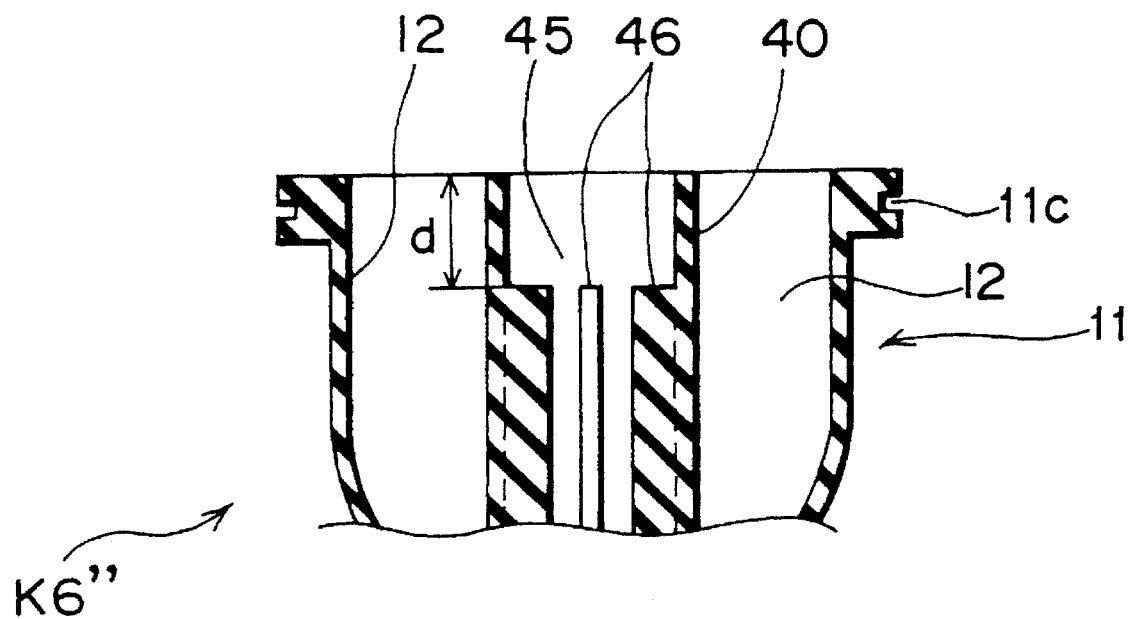
FIG. 27 is a fragmentary vertical sectional view of a grommet which is a second modification of the grommet of FIG. 21.

Moreover, in the grommet K6, the wire separating portions 46 extend axially downwardly from the mouth of the hole 45 of the tubular portion 40 but may also be spaced a predetermined distance d axially inwardly from the mouth of the hole 45 of the tubular portion 40 as shown in FIG. 27 illustrating a grommet K6" which is a second modification of the grommet K6. In this case, the filling material 20 is initially injected into a recess defined by the wire separating portions 46, the peripheral surface of the hole 45 and the wires 2 and then, is infiltrated into the wiring harness W from between the wires 2 confronting this recess. Therefore, infiltration area of the filling material 20 can be increased and thus, infiltration range of the filling material 20 is widened. As a result, sealing property of the filling material can be upgraded.

As is clear from the foregoing description of the grommets K6 and K6' of the present invention, since the tubular portion is provided in the panel mounting portion 11 and the wire separating portions capable of forming the desired clearances between the wires constituting the wiring harness extend in the tubular portion, the clearances can be formed between the wires. Thus, if the filling material is injected into the wiring harness from the nozzle inserted into one of the clearances, the filling material is infiltrated into gaps among the wires from the wires confronting the one clearance and thus, filling operation of the filling material 20 can be performed rapidly and positively.

Since the radial dimension of each of the wire separating portions is set at 10 to 35%, more preferably 15 to 30% of the diameter of the hole of the tubular portion, the wire separating portions can be thrusted in between the wires positively without elastic deformation of the wire separating portions and area of the wires confronting each clearance can be set at such a value that the injected filling material is properly infiltrated into the gaps among the wires in the wiring harness.

Furthermore, since the corner of the front end of each of the wire separating portions is rounded, the wire separating portions can be thrusted into the wiring harness easily and deformation, etc. of the wire separating portions can be prevented. As a result, working efficiency of the grommet can be improved.

Moreover, since the filling material is initially injected into the recess defined by the wire separating portions, the peripheral surface of the hole of the tubular portion and the wires and then, is infiltrated into the wiring harness from between the wires confronting the recess, infiltration area of the filling material can be increased and thus, sealing property of the filling-material can be upgraded. At this time, since infiltration speed of the filling material into the gaps among the wires is also raised, working efficiency of the grommet can be improved.

In addition, since the convex and concave portions are formed alternately on the peripheral surface of the wire separating portion so as to form the gap between the wire separating portion and the corresponding wires, infiltration range of the filling material can be widened and thus, sealing property of the filling material can be upgraded.

What is claimed is:

1. A grommet comprising:
   a panel mounting portion which is mounted on an opening of a panel and has a large-diameter hole for loosely receiving a wiring harness;
   a wire receiving portion which is formed axially integrally with the panel mounting portion and has a small-diameter hole for closely receiving the wiring harness;
   the large-diameter hole being communicated with the small-diameter hole such that the wiring harness is inserted through the small-diameter hole and the large-diameter hole in an insertion direction oriented from the small-diameter hole to the large-diameter hole; and
   a plurality of ribs which are provided in the large-diameter hole so as to extend in parallel with the insertion direction of the wiring harness.

2. A grommet as claimed in claim 1, wherein the ribs extend radially inwardly from a peripheral surface of the large-diameter hole and are arranged circumferentially at an identical interval so as to be disposed radially between an outer peripheral surface of the wiring harness and the peripheral surface of the large-diameter hole, while filling material is filled into the large-diameter hole so as to be bonded to the ribs.

3. A grommet as claimed in claim 2, wherein when the grommet is cut along a plane orthogonal to the insertion direction of the wiring harness, each of the ribs has a uniform thickness such that an undercut portion is not produced on the grommet during molding of the grommet with rubber by the use of a mold.

4. A grommet as claimed in claim 2, wherein the ribs are spaced a predetermined distance axially inwardly from an outer mouth of the large-diameter hole of the panel mounting portion,
   wherein in a state where the wiring harness has been inserted through the small-diameter hole and the large-diameter hole, the filling material is filled into the large-diameter hole so as to not only be bonded, as a plurality of first filling material sections, to side faces of the ribs, the peripheral surface of the large-diameter hole and an outer peripheral surface of the wiring harness but be spread, as a second filling material section, above the ribs such that the first filling material sections are coupled integrally with each other by the second filling material section.

5. A grommet as claimed claim 1, wherein the ribs are formed by rods extending axially from a bottom portion of a peripheral surface of the large-diameter hole adjacent to the small-diameter hole.

6. A grommet as claimed in claim 5, wherein, when the grommet is cut along a plane orthogonal to the insertion direction of the wiring harness, each of the ribs has a uniform thickness such that an undercut portion is not produced on the grommet during molding of the grommet with rubber by the use of a mold.

7. A grommet as claimed in claim 5, wherein the ribs are spaced a predetermined distance axially inwardly from an outer mouth of the large-diameter hole of the panel mounting portion, wherein in a state where the wiring harness has been inserted through the small-diameter hole and the large-diameter hole, filling material is filled into the large-diameter hole so as to not only be bonded, as a plurality of first filling material sections, to side faces of the ribs, the peripheral surface of the large-diameter hole and an outer peripheral surface of the wiring harness but be spread, as a second filling material section, above the ribs such that the first filling material sections are coupled integrally with each other by the second filling material section.

8. A grommet as claimed in claim 1, wherein when the grommet is cut along a plane orthogonal to the insertion direction of the wiring harness, each of the ribs has a uniform thickness such that an undercut portion is not produced on the grommet during molding of the grommet with rubber by the use of a mold.

9. A grommet as claimed in claim 8, wherein the ribs are spaced a predetermined distance axially inwardly from an outer mouth of the large-diameter hole of the panel mounting portion, wherein in a state where the wiring harness has been inserted through the small-diameter hole and the large-diameter hole, filling material is filled into the large-diameter hole so as to not only be bonded, as a plurality of first filling material sections, to side faces of the ribs, a peripheral surface of the large-diameter hole and an outer peripheral surface of the wiring harness but be spread, as a second filling material section, above the ribs such that the first filling material sections are coupled integrally with each other by the second filling material section.

10. A grommet as claimed in claim 1, wherein the ribs are spaced a predetermined distance axially inwardly from an outer mouth of the large-diameter hole of the panel mounting portion, wherein in a state where the wiring harness has been inserted through the small-diameter hole and the large-diameter hole, filling material is filled into the large-diameter hole so as to not only be bonded, as a plurality of first filling material sections, to side faces of the ribs, a peripheral surface of the large-diameter hole and an outer peripheral surface of the wiring harness but be spread, as a second filling material section, above the ribs such that the first filling material sections are coupled integrally with each other by the second filling material section.

11. A grommet as claimed in claim 1, further comprising:

a tubular portion which is provided in the large-diameter hole and has a hole communicated with the small-diameter hole such that the wiring harness is inserted through the small-diameter hole and the hole;

wherein the ribs extend radially inwardly from a peripheral surface of the hole of the tubular portion and are thrusted in between wires of the wiring harness so as to form clearances between the wires such that a tip of a nozzle for injecting filling material into the hole of the tubular portion can be inserted into one of the clearances.

12. A grommet as claimed in claim 11, wherein a radial dimension of each of the ribs is set at 10 to 35% of the diameter of the hole of the tubular portion.

13. A grommet as claimed in claim 12, wherein a corner of a front end of each of the ribs is rounded.

14. A grommet as claimed in claim 11, wherein a corner of a front end of each of the ribs is rounded.

15. A grommet as claimed in claim 11, wherein the ribs are spaced a predetermined distance axially inwardly from an outer mouth of the hole of the tubular portion.

16. A grommet as claimed in claim 11, wherein convex and concave portions are formed on an outer peripheral surface of each of the ribs, which is brought into contact with the wires of the wiring harness so as to form gaps between each of the ribs and the wires.

* * * * *

UNITED STATES PATENT AND TRADEMARK OFFICE
CERTIFICATE OF CORRECTION

PATENT NO. : 5,526,549
DATED : June 18, 1996
INVENTOR(S) : K. MORI et al.

It is certified that error appears in the above-indentified patent and that said Letters Patent is hereby corrected as shown below:

On the title page, item: [56], "References Cited", "U.S. PATENT DOCUMENTS", column 2, line 3, change "74/153 G" to ---174/153 G---.

On the title page, item: [56], "References Cited", "FOREIGN PATENT DOCUMENTS", insert ---1-66713 4/1989 Japan---.

On the title page, item: [56], "References Cited", "FOREIGN PATENT DOCUMENTS", insert ---2115221 9/1990 Japan---.

Signed and Sealed this

Fifth Day of November, 1996

Attest:

BRUCE LEHMAN

*Attesting Officer*      *Commissioner of Patents and Trademarks*